United States Patent [19]

Wright

[11] Patent Number: 4,500,692

[45] Date of Patent: Feb. 19, 1985

[54] PROCESS FOR BEAD SIZE CONTROL IN VINYL AROMATIC SUSPENSION POLYMERIZATION USING SODIUM POLYSTYRENESULPHONATE

[75] Inventor: Harold A. Wright, Murrysville, Pa.

[73] Assignee: Atlantic Richfield Company, Los Angeles, Calif.

[21] Appl. No.: 417,306

[22] Filed: Sep. 13, 1982

[51] Int. Cl.³ .............................................. C08F 2/20
[52] U.S. Cl. ................................................... 526/201
[58] Field of Search ........................................ 526/201

[56] References Cited

U.S. PATENT DOCUMENTS

| | | | |
|---|---|---|---|
| 2,673,194 | 3/1954 | Grim | 526/225 |
| 3,548,035 | 12/1970 | Ohe et al. | 526/201 |
| 3,649,610 | 3/1972 | Wright | 526/208 |
| 3,755,282 | 8/1973 | Wright | 526/216 |
| 4,129,706 | 12/1978 | Keppler et al. | 526/346 |
| 4,169,828 | 10/1979 | Wright | 526/346 |
| 4,352,916 | 10/1982 | Tandoll | 526/346 |

FOREIGN PATENT DOCUMENTS 802062 9/1958 United Kingdom .

*Primary Examiner*—Joseph L. Schofer
*Assistant Examiner*—Peter F. Kulkosky
*Attorney, Agent, or Firm*—Lewis J. Young

[57] ABSTRACT

The production of polymer beads from vinyl aromatic monomers, using an inorganic phosphate aqueous suspension polymerization process is effected with the addition of 0.0001 to 0.004 percent by weight of a polystyrenesulfonate with the production of beads having a narrow bead size distribution. In addition to the improved bead size distribution, large beads can be produced which retain their sphericity.

9 Claims, No Drawings

PROCESS FOR BEAD SIZE CONTROL IN VINYL AROMATIC SUSPENSION POLYMERIZATION USING SODIUM POLYSTYRENESULPHONATE

BACKGROUND OF THE INVENTION

The production of vinyl aromatic polymer beads, such as polystyrene beads, by aqueous suspension systems is a wellknown and commercial practice. Such polymerizations can be effected by the suspension polymerization of a vinyl aromatic monomer in an aqueous medium using an oil-soluble polymerization catalyst, with a suspension system comprising a finely divided difficultly water-soluble inorganic phosphate, such as tricalcium phosphate, in conjunction with a modifier such as sodium dodecylbenzene sulfonate. Such suspension polymerization systems are described, for example, in Grim U.S. Pat. No. 2,673,194.

The suspension systems described in the Grim patent produce polymer beads having a broad particle size distribution, with average bead diameter being dependent upon the amount of suspending agent and type of modifier in the system. Although the average bead diameter can be somewhat controlled by varying parameters such as the ratio of suspending agent to modifier or the ratio of suspending agent and modifier to monomer, beads are still produced which have a broad bead size distribution. The production of beads which have a narrow size distribution is desired if they are to be used for molded foams. For molding thin-walled cups or foams with intricate surfaces, oversize foamed beads cannot be tolerated because they do not fill a mold properly. The result is a molding with holes and/or a rough surface. For molding two-foot thick billets to be cut into insulation boards, oversized foamed beads can fill the molds readily. However, undersized foamed beads are objectionable because they inhibit the penetration of steam to the center of the billet. Center-cut boards from such billets exhibit poor bead-to-bead fusion and have little or no flexural strength. The customary ranges of bead sizes for typical applications are: cups, through 30 on 50 mesh; packaging, through 18 on 30 mesh; and billets, through 8 on 20 mesh. Each application may require beads differing in molecular weight and in the incorporation of flame retardants, dyes, plasticizers, fastmolding agents, cell-nucleating agents, and the like.

The median bead size and bead size distribution is normally determined by subjecting a sample to screen analysis using U.S. Standard Sieves. The Distribution Index, DI, is then calculated as follows:

$$DI = \frac{\text{standard deviation (mm)}}{\text{median bead diameter (mm)}} \times 100$$

The lower the Distribution Index, the more narrow the bead size distribution and the less unwanted fines or larger beads produced.

Attempts to produce large-size beads with narrow bead size distribution ranges have been previously made and are continuing. Hohenstein et al., in U.S. Pat. No. 2,672,392, reduced the amount of extremely fine beads by adding less than 0.01 percent based on the monomer of a water-soluble persulfate as modifier for the calcium phosphate stabilizer. In U.S. Pat. No. 3,631,014 narrow distribution of bead sizes larger than 300 microns (45 mesh) in diameter are produced by the addition of at least 0.0003 percent by weight based on monomer of sodium bisulfite as modifier for the phosphate. In U.S. Pat. No. 3,649,610 narrow distributions of bead sizes larger than 750 microns (25 mesh) in diameter are produced by adding at least 0.01 percent by weight based on monomer of certain terminal vicinal hydroxyketo compounds as a modifier for the phosphate. In U.S. Pat. No. 3,755,282 narrow distributions of bead sizes larger than 1200 microns (16 mesh) in diameter are produced by adding at least 0.0001 percent by weight based on monomer of $\alpha\beta$-unsaturated carboxylic acids as modifier for the phosphate. In U.S. Pat. No. 4,170,699, bead size distribution is improved for beads larger than 300 microns (45 mesh) by the use of a bisulfite or persulfate modifier in the presence of glutamic acid as an adjunct modifier.

We have now discovered that by the addition of a sodium polystyrenesulfonate to an inorganic phosphate suspension system, narrow bead size distribution can be effected and the production of large spherical beads, greater than 1000 microns (18 mesh) is possible with improved bead sphericity.

Although the use of sodium polystyrenesulfonate has been suggested as a sole suspending agent for vinyl monomers, as described in British Pat. No. 802,062, it is surprising that use of a few parts per million of such a material in conjunction with a phosphate suspension system would provide any unusual benefits, such as a narrow bead size distribution or maintenance of sphericity of large-size beads.

BRIEF SUMMARY OF THE INVENTION

The bead size distribution is improved and large-size spherical beads are produced by addition to an aqueous suspension of a vinyl aromatic monomer containing an oil-soluble, free-radical-producing catalyst, the suspension containing a finely divided difficultly water-soluble phosphate suspending agent, between 0.0001 and 0.004 percent by weight, based on monomer, of a sodium polystyrenesulfonate, and subjecting the suspension to an elevated temperature to polymerize the monomer.

DETAILED DESCRIPTION OF THE INVENTION

The present invention is useful in the suspension polymerization of vinyl aromatic monomers such as styrene, paramethylstyrene, mono- and dichlorostyrene, as well as the copolymerization of vinyl aromatic monomers with such monomers as divinylbenzene, an alkyl acrylate, allyl acrylate, an alkyl methacrylate, allyl methacrylate, a diallyl ester of a dibasic aliphatic acid, a diallyl ester of a dibasic aromatic acid, butadiene, and polymers capable of further polymerization such as styrene-butadiene, styrene-isoprene, and polybutadiene rubbers.

The finely divided, difficultly water-soluble phosphates useful as dispersing agents in the practice of this invention are conventional and are those described, for example, in Grim U.S. Pat. No. 2,673,194. They include those finely divided phosphates difficultly soluble in water containing for each phosphate group at least three equivalents of a metal, the carbonate of which is only slightly soluble in water, e.g., tricalcium phosphate, hydroxy-apatite, magnesium phosphate, etc. Advantageously, the amount of phosphate to be employed in this invention ranges from about 0.10 to 4.0% by weight based on monomer. Preferably, the phosphate is used in an amount of between 0.2 to 1.2% by weight based on the monomer. The average particle size of polymer beads produced in the suspension polymerization is affected by the total amount of phosphate suspending agent; for example, suspension with larger amounts of phosphate suspending agent yields beads of a smaller average particle size.

There is added to the aqueous suspension, in addition to the phosphate suspending agent, between 0.0001 to 0.004 percent by weight, based on monomer, of a sodium polystyrenesulfonate. The use of less than about 0.0001 percent by weight will not give the desired suspension while use of greater than about 0.004 shows no improvement over lower amounts. Preferably, the sodium polystyrenesulfonate is added in an amount of about 0.0005 percent by weight, based on the monomer.

The sodium polystyrenesulfonates usable in the present invention are those wherein the linear polystyrene has a molecular weight in the range of 20,000 to 500,000. Use of polystyrenes having molecular weights in excess of about 500,000 results in the production of smaller bead sizes and broader bead size distributions. Such are formed preferably as sodium salts of polystyrene sulfonic acid. The degree of sulfonation of the linear polystyrenes may vary from about 50 percent to 100 percent, i.e., one sulfonate group per styrene group, with substantially 100 percent sulfonation being preferred. Suitable commercial sodium polystyrenesulfonates are produced by National Starch and Chemical Co. under the trademark Versa-TL ®: for example, Versa-TL #70, a substantially 100 percent sulfonated polystyrene having a molecular weight of about 70,000; Versa-TL #47, a substantially 100 percent sulfonated polystyrene having a molecular weight of about 40,000; and Versa-TL #500, a substantially 100 percent sulfonated polystyrene having a molecular weight of about 500,000.

The time and temperature cycles for the polymerization may be those conventionally used. Conveniently, the cycles described in the Grim patent, referred to above, or the two-stage temperature cycle described by D'Alelio, U.S. Pat. No. 2,692,260, is used. The process may be used with monomer to water ratios which vary from about 0.3 to 1.5 parts by weight monomer per 1 part by weight of water.

The invention is further illustrated by reference to the following examples, wherein parts are parts by weight unless otherwise indicated.

EXAMPLE I

To a series of 12-oz. crown-cap bottles there was charged 100 g. water, the amount of tricalcium phosphate (TCP), and the amount of sodium polystyrenesulfonate (SPS) listed in the following Table. The sodium polystyrenesulfonate used was a sodium salt of polystyrenesulfonic acid, Versa-TL #70 (a substantially 100 percent sulfonated polystyrene having a molecular weight of about 70,000). To this aqueous mixture there was added 100 g. of styrene containing 0.25 g benzoyl peroxide and 0.05 g. t-butyl perbenzoate. The bottles were sealed and heated with end-over-end agitation for a period of 6 hours at 90° C. to form hard polymer beads. The bottles were cooled to room temperature and the aqueous slurry was then acidified to a pH of about 1.0 to dissolve the phosphate. The resultant beads were separated, washed with water and air dried. The dried beads were subjected to screen analysis using U.S. Standard Sieves to determine median bead size and standard deviation from the median size. The results are shown in Table I:

TABLE I

| Run No. | Stabilizers | | Product | | |
|---|---|---|---|---|---|
| | TCP (%) | SPS (%) | Median Size mm | mesh | DI (%) |
| 1 | 0.25 | 0.001 | 1.967 | 10 | 21.8 |
| 2 | 0.30 | 0.0001 | 1.908 | 10.5 | 22.5 |
| 3 | 0.30 | 0.0005 | 1.460 | 13.5 | 25.2 |
| 4 | 0.30 | 0.0010 | 1.681 | 12 | 24.0 |
| 5 | 0.30 | 0.0020 | 2.341 | 8 | 25.3 |
| 6 | 0.35 | 0.0001 | 2.268 | 8 | 20.7 |
| 7 | 0.35 | 0.0005 | 1.160 | 16.5 | 29.1 |
| 8 | 0.35 | 0.0010 | 1.501 | 13.5 | 26.2 |
| 9 | 0.35 | 0.0020 | 1.832 | 11 | 24.3 |
| 10 | 0.40 | 0.0001 | 2.206 | 9 | 20.5 |
| 11 | 0.40 | 0.0005 | 1.002 | 18 | 27.7 |
| 12 | 0.40 | 0.0010 | 1.293 | 15 | 32.5 |
| 13 | 0.20 | 0.0005 | 2.285 | 8 | 21.4 |
| 14 | 0.25 | 0.0005 | 2.031 | 10 | 23.9 |
| 15 | 0.25 | 0.0010 | 1.950 | 10.5 | 21.8 |
| 16 | 0.40 | 0.0020 | 1.639 | 12.5 | 25.3 |
| 17 | 0.50 | 0.0005 | 1.036 | 17.5 | 31.8 |
| 18 | 0.50 | 0.0010 | 0.764 | 24 | 28.9 |
| 19 | 0.50 | 0.0020 | 1.316 | 15 | 28.1 |
| 20 | 0.60 | 0.0010 | 0.735 | 25 | 27.8 |
| 21 | 0.60 | 0.0020 | 0.892 | 20 | 37.3 |

Beads produced which were larger than 10 mesh, using the Versa-TL #70, were essentially spherical.

EXAMPLE II

A series of further runs were made using the procedure of Example I, with 0.60 g. tricalcium phosphate (TCP) used in each run and varying the type and amount of sodium polystyrenesulfonate. Type 70 was Versa-TL #70; Type 121 was the same as Type 70 except that the polystyrene had a molecular weight of about 120,000; and Type 500 was the same as Type 70 except that the polystyrene had a molecular weight of about 500,000. The results are shown in Table II:

TABLE II

| Run No. | Sodium Polystyrenesulfonate | | Product | | |
|---|---|---|---|---|---|
| | Type | (%) | Median Size mm | mesh | DI (%) |
| 1 | 70 | 0.0002 | 1.666 | 12 | 21.0 |
| 2 | 70 | 0.0004 | 1.244 | 16 | 24.4 |
| 3 | 70 | 0.0006 | 1.069 | 17.5 | 27.1 |
| 4 | 121 | 0.0002 | 1.374 | 14.5 | 21.9 |
| 5 | 121 | 0.0004 | 1.000 | 18 | 27.6 |
| 6 | 121 | 0.0006 | 0.756 | 23 | 28.3 |
| 7 | 500 | 0.0002 | 1.248 | 16 | 25.8 |
| 8 | 500 | 0.0004 | 0.799 | 21 | 27.0 |
| 9 | 500 | 0.0006 | 0.704 | 25 | 35.3 |

As can be seen by the results, the use of a higher molecular weight polystyrenesulfonate produces smaller size beads, while the use of larger amounts of a particular polystyrenesulfonate also results in a reduction in bead sizes.

EXAMPLE III

To a 100-gallon stirred tank reactor there was charged 400 pounds of water, 2 pounds of tricalcium phosphate, 0.0024 pound (1.09 g.) of Versa-TL #70 (sodium polystyrenesulfonate), 400 pounds of styrene, 1.36 pounds of benzoyl peroxide, and 0.2 pounds of t-butyl perbenzoate. The reactor was sealed and the contents heated, with agitation, at 73 revolutions per minute to and at 90° C. for 5 hours to form hard beads. The bead sizes were determined by sieve analysis to be:

| U.S. Sieve No. | Percent |
| --- | --- |
| on 8 - mesh | 2.3 |
| on 10 - mesh | 1.5 |
| on 16 - mesh | 60.2 |
| on 20 - mesh | 32.6 |
| on 25 - mesh | 2.4 |
| on 35 - mesh | 0.6 |
| on pan | 0.2 |

The yield of beads that could be used for billet molding was at least 99%, excluding those that passed a 35-mesh, or 96%, excluding those that passed a 20-mesh sieve. Of special interest was the fact that the largest (i.e. on 8-mesh) beads were all spherical in shape.

Other suspension systems, (i.e. modified calcium phosphates or water soluble polymers such as hydroxyethylcellulose, polyvinylpyrrolidone or polyvinyl alcohol), that have been tested for making such large beads either fail to suspend the monomer beyond about 60% conversion or produce some off-round particles shaped like discs, eggs or beans, in that portion of the product that is retained on a 12-mesh sieve.

What is claimed is:

1. In a process for producing polymer beads from a vinyl aromatic monomer, by suspending the monomer containing a monomer-soluble, free radical-producing catalyst in an aqueous medium, with the aid of from 0.1 to 4.0 percent by weight based on monomer of a finely divided, difficultly water-soluble phosphate suspending agent and subjecting the suspension to an elevated temperature to cause said monomer to polymerize; the improvement of producing large sized spherical polymer beads having an average particle size greater than 1000 microns and having a narrow distribution of bead diameter sizes which consists of adding to said suspension between 0.0001 to 0.0040 percent by weight, based on monomer, of a sodium polystyrenesulfonate.

2. The process as defined in claim 1 wherein said phosphate suspending agent is tricalcium phosphate.

3. The process as defined in claim 1 wherein said sodium polystyrenesulfonate comprises a sulfonated polystyrene having a molecular weight of between 20,000 to 500,000.

4. The process as defined in claim 3 wherein said sodium polystyrenesulfonate is a substantially 100 percent sulfonated polystyrene.

5. The process as defined in claim 1 wherein said sodium polystyrenesulfonate is present in an amount of about 0.0005 percent by weight.

6. The process as defined in claim 2 wherein said tricalcium phosphate is present in an amount of 0.2 to 1.2 percent by weight.

7. The process as defined in claim 1 wherein said vinyl aromatic monomer is selected from the group consisting of styrene, para-methylstyrene, monochlorostyrene, and dichlorostyrene.

8. The process as defined in claim 7 wherein said vinyl aromatic monomer is copolymerized with a monomer selected from the group consisting of divinylbenzene, an alkyl acrylate, allyl acrylate, an alkyl methacrylate, allyl methacrylate, a diallyl ester of a dibasic aliphatic acid, a diallyl ester of a dibasic aromatic acid, butadiene, and polymers capable of further polymerization selected from the group consisting of styrene-butadiene rubbers, styrene-isoprene rubbers, and polybutadiene rubbers.

9. In a process for producing polystyrene beads from styrene, by suspending the styrene containing a styrene-soluble, free radical-producing catalyst in an aqueous medium, with the aid of from 0.1 to 4.0 percent by weight based on the styrene of tricalcium phosphate and subjecting the suspension to an elevated temperature to cause said styrene to polymerize; the improvement of producing large-sized spherical beads having an average particle size greater than 1000 microns and having a narrow distribution of bead diameter sizes which consists of adding to said suspension between 0.0001 to 0.0004 percent by weight, based on styrene, of a sodium polystyrene-sulfonate which comprises a sulfonated polystyrene having a molecular weight of between 20,000 to 500,000 that is between 50–100 percent sulfonated.

* * * * *